(12) United States Patent
Khalil et al.

(10) Patent No.: US 8,591,731 B2
(45) Date of Patent: *Nov. 26, 2013

(54) DUAL MEDIA FLUID FILTER

(75) Inventors: Ibrahim Khalil, Barrington, IL (US); John W. Shaw, Ponca City, OK (US)

(73) Assignee: Filtran LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,064

(22) Filed: Sep. 26, 2011

(65) Prior Publication Data

US 2012/0012517 A1    Jan. 19, 2012

Related U.S. Application Data

(63) Continuation of application No. 12/343,939, filed on Dec. 24, 2008, now Pat. No. 8,052,867.

(60) Provisional application No. 61/042,144, filed on Apr. 3, 2008.

(51) Int. Cl.
| | |
|---|---|
| *B01D 29/00* | (2006.01) |
| *B01D 29/01* | (2006.01) |
| *B01D 29/11* | (2006.01) |
| *B01D 36/02* | (2006.01) |
| *F01M 11/03* | (2006.01) |
| *B01D 35/00* | (2006.01) |

(52) U.S. Cl.
USPC ............ 210/167.04; 210/167.08; 210/167.31; 210/314; 210/316; 210/323.1; 210/340; 210/455

(58) Field of Classification Search
None
See application file for complete search history.

(56) References Cited

U.S. PATENT DOCUMENTS

| 5,647,328 | A | 7/1997 | Fournier et al. |
|---|---|---|---|
| 5,817,236 | A | 10/1998 | Chiba |
| 6,582,593 | B2 | 6/2003 | Wolford et al. |
| 6,858,057 | B2 | 2/2005 | Healey |
| 7,087,160 | B2 | 8/2006 | Beer et al. |
| 8,052,867 | B2 * | 11/2011 | Khalil et al. ............. 210/167.04 |
| 2005/0133428 | A1 | 6/2005 | Peet et al. |

* cited by examiner

*Primary Examiner* — Benjamin Kurtz
(74) *Attorney, Agent, or Firm* — Loza & Loza, LLP; Leo J. Jennings

(57) ABSTRACT

A filter apparatus has a housing, an inlet port on one side of the housing and an outlet port on an opposed side of the housing. Sheet media is disposed in the housing having a first opening through the sheet media. Also dispersed in the housing is a bag media comprising an enclosed bag with a second opening into the bag. The first opening and the second opening are connected in fluid communication with each other and the sheet media is disposed before the bag media in the direction of flow through the housing so that both media are mounted inside the housing. Some fluid entering the inlet passes through both openings and through the bag media and into the outlet, and other fluid entering the inlet passes through the sheet media and then to the outlet.

23 Claims, 4 Drawing Sheets

DUAL MEDIA FLUID FILTER

PRIORITY

This application is a continuation of application Ser. No. 12/343,939, filed Dec. 24, 2008, now U.S. Pat. No. 8,052,867 which claims priority of Provisional Patent Application No. 61/042,144, filed Apr. 3, 2008, the disclosures of which are incorporated by reference in its entirety.

FIELD OF THE INVENTION

The invention relates to fluid filter devices and methods, and further to oil and transmission fluid filters.

BACKGROUND OF THE INVENTION

Various types of fluid filters are in wide use. Some examples of fluid filters include filters that are used in connection with engines and/or vehicles, such as, for example, engine oil and/or transmission fluid filters. Many typical transmission filters include a housing having an inlet and an outlet, with the housing sometimes having a relatively flat thin profile in order to fit in the sump of the transmission. Transmission fluid often enters these filters through an inlet port at the bottom flat side, and exits through an outlet port on the top side. The housing typically has two halves, a top half and a bottom half, that are attached to each other at their periphery, either by crimping or welding. The housing halves may both be plastic, or one or both of the halves may be metal.

One example of such type of filters is a single-layer flat sheet media filter, in which a flat sheet of filtering media spans across the inside of the housing, and for example, can be held at the edges of the housing near the attachment of the two housings. Another type of such filter is a so-called bag filter, in which a sheet of filtering media is folded over and sealed to itself around its entire non-folded periphery, and thus is formed essentially into an enclosed bag, with a hole forming an opening into the bag. The opening is attached to the inlet port, typically by being sealed to the inlet port. In such bag filters, the fluid flows directly from the inlet port of the housing into the inside of the bag, and passes through the bag media until it is outside the bag and then flows out the outlet port of the housing.

The media for the flat sheet or bag can be of a very coarse filtration type, such as a metal or plastic screen, or coarse fabric, or can range to a finer type such as, for example, a medium or very fine woven or felt type on fine fabric material.

These filters have been found to be very suitable in use, for example in vehicle transmissions to filter vehicle transmission fluid. However, a compromise must often be reached with regard to the degree of fineness of filtering media. For example, the fluid or oil is typically more viscous or thick in a cold start-up condition, and then becomes more thin, or less viscous, as the transmission heats up to its steady operating temperature. A media that is suitable for filtering at the higher operating temperature may be so fine that fluid is impeded or blocked to an undesirable extent during cold start-up operation. On the other hand, a media that is coarse enough to provide some filtering at start-up operation, as well as the necessary flow, may not provide desirably fine filtration at any temperature.

One approach that has been used to overcome this problem has been to attempt some form of bypass, whereby the fine filter material is partially or fully bypassed during cold start operations. However, it is always desirable to have new and improved filter arrangements.

SUMMARY OF THE INVENTION

In one aspect of a preferred embodiment, a filter has a housing, an inlet port on one side of the housing, an outlet port on an opposed side of the housing, sheet media disposed in the housing having a first opening through the sheet media, a bag media comprising an enclosed bag with a second opening into the bag, wherein the first opening and the second opening are connected in fluid communication with each other and wherein the sheet media is disposed before the bag media in the direction of flow through the housing so that both media are mounted inside the housing so that some fluid entering the inlet passes through both openings and through the bag media and into the outlet, and other fluid entering the inlet passes through the sheet media and then to the outlet.

A further embodiment of the apparatus includes a housing, an inlet port on one side of the housing, an outlet port on an opposed side of the housing, a sheet media spanning at least partially across the housing with a first opening through the sheet media, a bag media comprising an enclosed bag with a second opening into the bag, and a spacer for spacing the bag apart from the flat media and for connecting the first opening of the sheet media to the second opening of the bag media, wherein both media are mounted inside the housing so that some fluid entering the inlet passes through both openings and through the bag media and then to the outlet, and other fluids entering the inlet passes through the sheet media and then to the outlet.

In another aspect of the invention, a filter apparatus includes a housing with an inlet port on one side and an outlet port on an opposed side. In addition, a sheet filter means is disposed in the housing having a first opening, a bag filter means with an enclosed bag at the second opening into the bag, wherein the first opening and the second opening are connected in fluid communication with each other and wherein the sheet filter means is disposed before the bag filter means in the direction of flow through the housing so that both filter means are mounted inside the housing so that some fluid entering the inlet passes through both openings and through the bag filter means and into the outlet, and other fluid entering the inlet passes through the sheet filter means and then to the outlet.

A further embodiment discloses a filter apparatus with a housing having an inlet port on one side and an outlet port on an opposed side of the housing. There is a sheet filter means spanning at least partially across the housing with a first opening through the sheet filter means, and a bag filter means comprising an enclosed bag with a second opening into the bag. In addition, the apparatus contains space means for spacing the bag apart from the flat filter means and for connecting the first opening of the sheet filter means to the second opening of the bag filter means, wherein both filter means are mounted inside the housing so that some fluid entering the inlet passes through both openings and through the bag filter means and then to the outlet, and other fluids entering the inlet passes through the sheet filter means and then to the outlet.

Yet another aspect of a preferred embodiment discloses a filter method using a filter having a housing with an inlet port on one side of the housing, and an outlet port on an opposed side of the housing, comprising passing fluid through a sheet media disposed in the housing having a first opening through the sheet media and passing fluid through a bag media comprising an enclosed bag with a second opening into the bag, wherein the first opening and the second opening are connected in fluid communication with each other and wherein the sheet media is disposed before the bag media in the direction of flow through the housing so that both media are mounted inside the housing so that some fluid entering the inlet passes through both openings and through the bag media and into the outlet, and other fluid entering the inlet passes through the sheet media and then to the outlet.

A further embodiment discloses a filter method using a filter having a housing, an inlet port on one side of the housing, and an outlet port on an opposed side of the housing, comprising passing fluid through a sheet media spanning at least partially across the housing with a first opening through the sheet media, passing fluid through a bag media comprising an enclosed bag with a second opening into the bag, and spacing the bag apart from the flat media and connecting the first opening of the sheet media to the second opening of the bag media using a spacer, wherein both media are mounted inside the housing so that some fluid entering the inlet passes through both openings and through the bag media and then to the outlet, and other fluids entering the inlet passes through the sheet media and then to the outlet.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

One aspect of some embodiments of the present invention provide for a filter having a housing, an inlet port on one side of the housing, an outlet port on an opposed side of the housing, sheet media disposed in the housing having a first opening through the sheet media, a bag media comprising an enclosed bag with a second opening into the bag, wherein the first opening and the second opening are connected in fluid communication with each other and wherein the sheet media is disposed before the bag media in the direction of flow through the housing so that both media are mounted inside the housing so that some fluid entering the inlet passes through both openings and through the bag media and into the outlet, and other fluid entering the inlet passes through the sheet media and then to the outlet.

Another aspect of some embodiments of the present invention includes a filter having a housing, an inlet port on one side of the housing, an outlet port on an opposed side of the housing, a sheet media spanning at least partially across the housing with a first opening through the sheet media, a bag media comprising an enclosed bag with a second opening into the bag, and a spacer for spacing the bag apart from the flat media and for connecting the first opening of the sheet media to the second opening of the bag media, wherein both media are mounted inside the housing so that some fluid entering the inlet passes through both openings and through the bag media and then to the outlet, and other fluids entering the inlet passes through the sheet media and then to the outlet.

Figure 1:
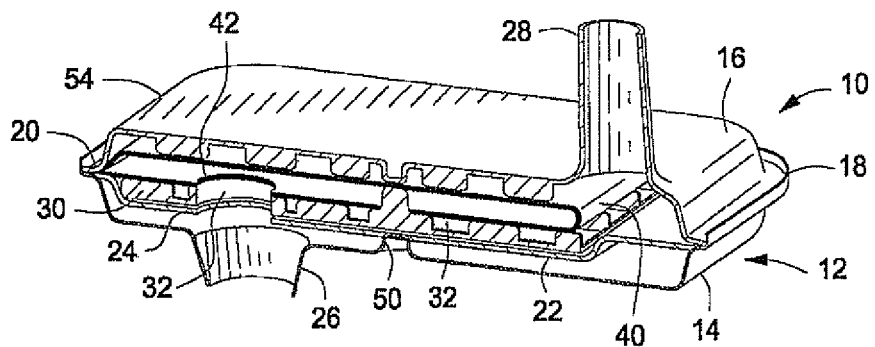
FIG. 1 is a cutaway view of a filter according to a first preferred embodiment of the invention.

FIG. 1 depicts a first embodiment of a filter 10 having a housing 12 defined by a lower inlet-side housing half 14 and an upper outlet-side housing half 16. The housing halves 14 and 16 may be made of any suitable material, and in the example given the lower half 14 is made of metal, while the upper half 16 is made of molded plastic. The two housing halves 14 and 16 are secured together in a leak-proof fashion by crimping a flange 18 on the metal lower housing 14 around a flange 20 on the plastic upper housing 16. This provides a sealed connection around the entire periphery of the housing 12.

Inside the housing 12, a fine sheet media 22 spans across the entire inside of the housing 12. The fine sheet media 22 is in the form of a generally, or substantially, flat sheet, and is attached inside the housing 12 around its entire periphery by being sandwiched between the flanges 18 and 20. The fine sheet media 22 has an opening 24 cut therethrough. It will be appreciated that depending on operating conditions, some of the fluid will enter the inlet port 26 and pass through the fine sheet media 22, and then continue on a path through the outlet port 28, However, some fluid also can pass through the opening 24. Thus, fluid flow that passes from the inlet port 26 to the outlet port 28 passes at last through either the fine sheet media 22 and/or the opening 24.

Figure 3:
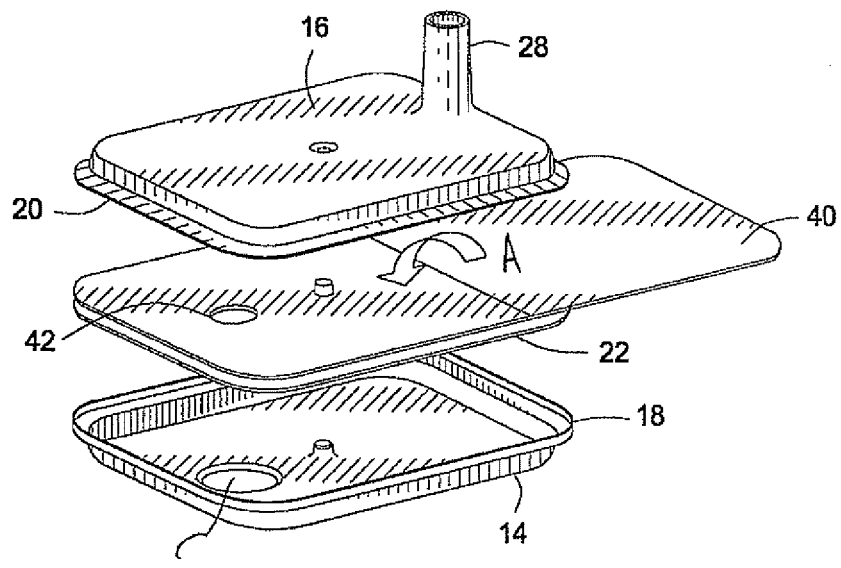
FIG. 3 is an exploded view of the embodiment of FIG. 1, prior to folding of the coarse media.
Figure 2:
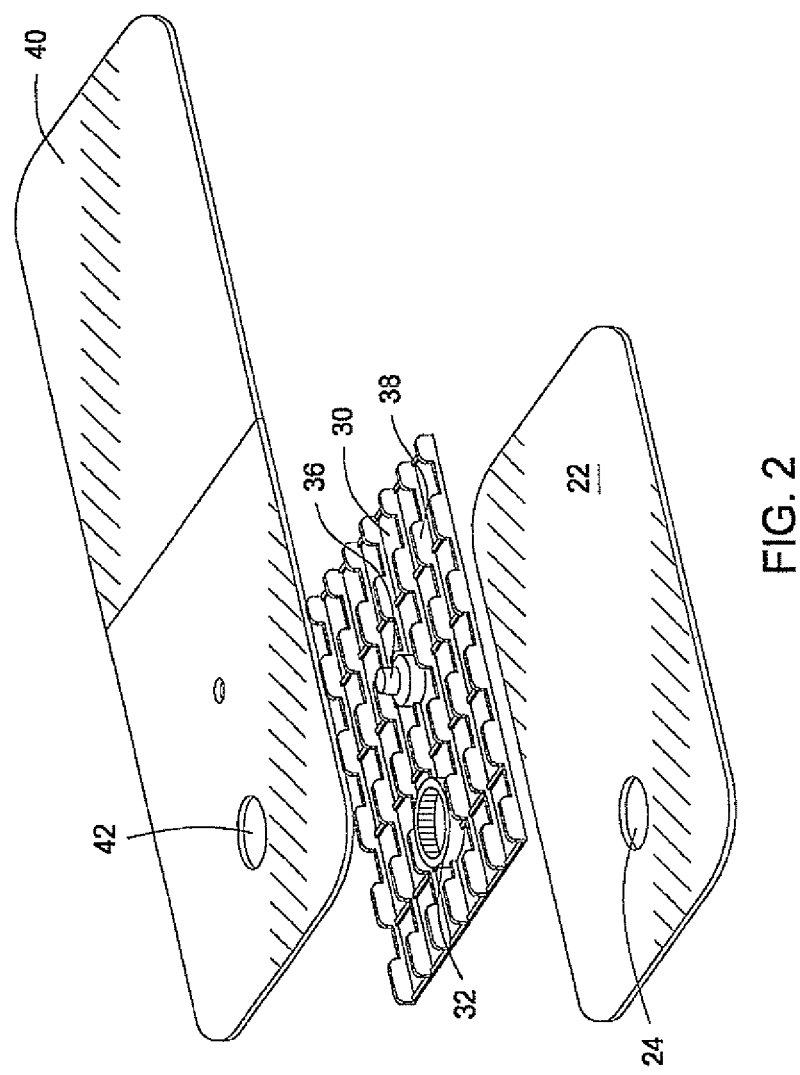
FIG. 2 is an exploded view of a coarse bag media, spacer rib tray, and fine sheet media as used in the embodiment of FIG. 1.

A spacer 30 is provided as shown and has an internal ring 32. A coarse bag media 40 in the form of a folded over bag is also provided. The coarse bag media 40 is initially constructed by folding a flat sheet, as shown in FIG. 2, that is folded over in the direction of the arrow A in FIG. 3, and then has its non-folded edges sealed to each other to form a generally rectangular bag. An opening 42 in FIG. 2 is provided into the coarse bag media 40. The ring 32 of the spacer 30 is sealed against both the opening 24 of the fine sheet media 22 and also sealed against the opening 42 of the coarse bag media 40. Thus, some fluid that enters the inlet port 26 can pass through the opening 24, then directed through the coarse bag media 40. The coarse bag media 40 has a relatively large surface area due to its bag shape and thus can accommodate a high volume of viscous flow. As temperatures increase, an increasing fraction of the fluid will tend to flow through the fine media 22.

Figure 4:
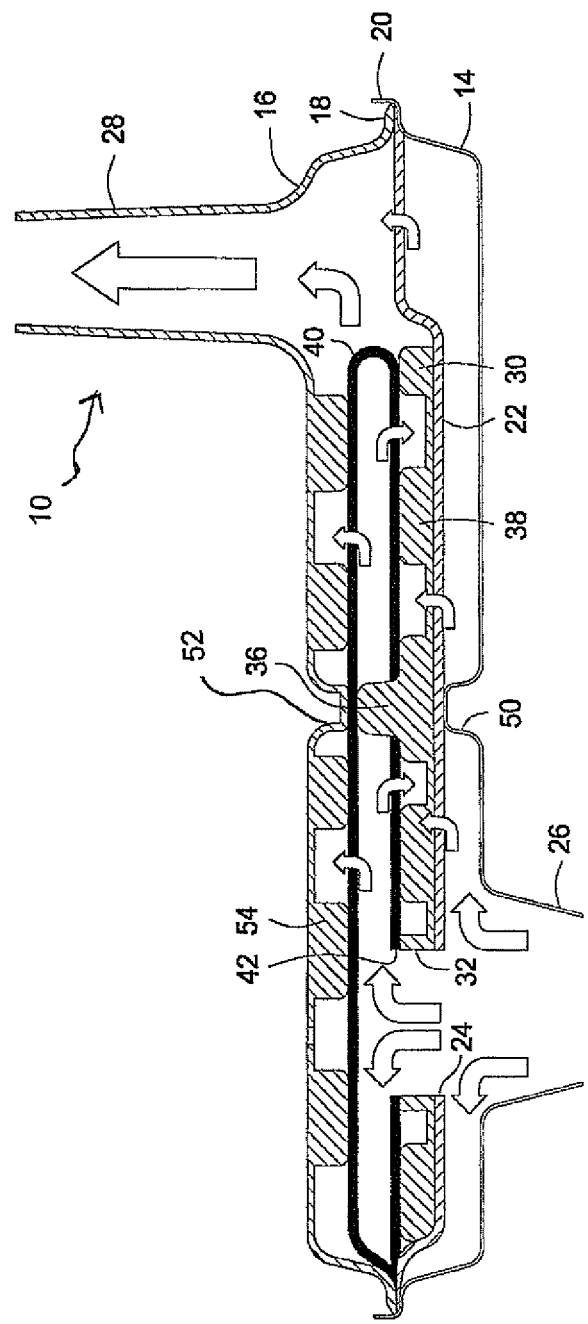
FIG. 4 is a side cross-sectional view of the embodiment of FIG. 1.

The embodiment shown in FIG. 4 thus provides a two-media arrangement in which a fine media in the form of a relatively flat single layer is provided in conjunction with a bag-shaped relatively coarse media. Fluid primarily flows in a parallel fashion through one or the other media, and except for the possibility of some small amount, fluid will tend not flow through both media serially.

Some embodiments of the invention can have essentially the same arrangement as shown in FIG. 4 but with the fine and coarse aspects of the media being reversed. That is, the bag can provide the fine media, while the single layer flat sheet provides the coarse media.

Figure 5:
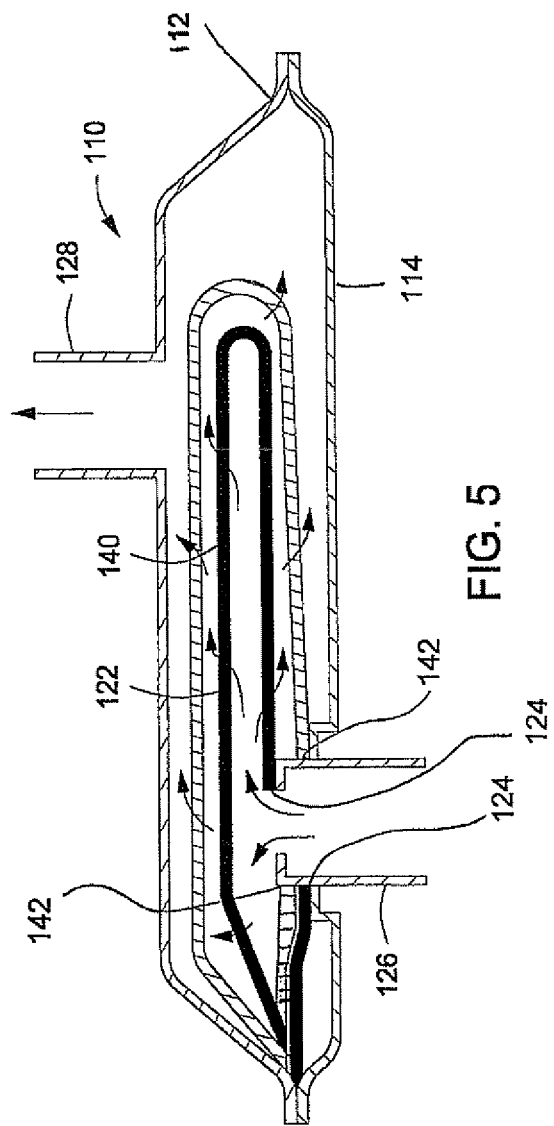
FIG. 5 is a cross-sectional view of a second embodiment of the invention.

FIG. 5 shows a second embodiment of the invention. The filter 110 has a housing 112 which is substantially similar to the housing 12 with respect to the first embodiment, except that the inlet port 126 extends upward into the housing 112 and is connected directly to a pair of bag media which are now described in more detail. For example, a first bag 122 having a finer media is provided having an opening 124 sealed to the inlet port 126, and this bag 122 is completely surrounded by a coarser media bag 140 having an opening 142, which is also sealed to the inlet port 126. Thus openings 124 and 142 are both sealed to each other and to the inlet port 126. The fine bag 122 also has an outlet hole 128. Thus, some of the fluid will flow serially through both bags, while some fluid can pass through the hole 128 so it is filtered only by the outer coarser bag 140. In this way the filter 110 provides a combination of serial and parallel flow. Schematic flow arrows are also provided in FIG. 5 to indicate the interior flow path.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter apparatus comprising:
   a housing;
   an inlet port on one side of the housing;
   an outlet port on an opposed side of the housing;
   a first media disposed in the housing having a first opening through the first media;
   a second media with a second opening through the second media, wherein the first opening and the second opening are connected in fluid communication with each other and wherein the first media is disposed before the second media in the direction of flow through the housing so that both media are mounted inside the housing so that some fluid entering the inlet passes through both openings and through the second media and into the outlet, and other fluid entering the inlet passes through the first media and then to the outlet.

2. A filter apparatus according to claim 1, wherein the second media is relatively coarser than the first media.

3. A filter apparatus according to claim 1, wherein the first media is disposed towards the inlet port, relative to the second media which is disposed toward the outlet port in the flow direction.

4. A filter apparatus according to claim 1, further comprising a dimple which spaces the first media from the one side of the housing.

5. A filter apparatus according to claim 1, further comprising a spacer that spaces part of the first media from the second media.

6. A filter apparatus according to claim 5, wherein the spacer comprises a ring that connects the first opening in the first media with the second opening in the second media.

7. A filter apparatus comprising:
   a housing;
   an inlet port on one side of the housing;
   an outlet port on an opposed side of the housing;
   a first media spanning at least partially across the housing with a first opening through the first media;
   a second media with a second opening into the second media; and
   a spacer for spacing the second media apart from the first media and for connecting the first opening of the first media to the second opening of the second media, wherein both media are mounted inside the housing so that some fluid entering the inlet passes through both openings and through the second media and then to the outlet, and other fluids entering the inlet passes through the first media and then to the outlet.

8. A filter apparatus according to claim 7, wherein the second media is relatively coarser than the first media.

9. A filter apparatus according to claim 7, wherein the first media is disposed towards the inlet port, relative to the second media which is disposed toward the outlet port in the flow direction.

10. A filter apparatus according to claim 7, further comprising a dimple which spaces the first media from the one side of the housing.

11. A filter apparatus according to claim 7, wherein the spacer comprises a ring that connects the first opening in the first media with the second opening in the second media.

12. A filter apparatus comprising:
    a housing;
    an inlet port on one side of the housing;
    an outlet port on an opposed side of the housing;
    first filter means disposed in the housing having a first opening through the first filter means;
    second filter means with a second opening through the second filter means, wherein the first opening and the second opening are connected in fluid communication with each other and wherein the first filter means is disposed before the second filter means in the direction of flow through the housing so that both filter means are mounted inside the housing so that some fluid entering the inlet passes through both openings and through the second filter means and into the outlet, and other fluid entering the inlet passes through the first filter means and then to the outlet.

13. A filter apparatus according to claim 12, wherein the second filter means is relatively coarser than the second filter means.

14. A filter apparatus according to claim 12, wherein the first filter means is disposed towards the inlet port, relative to the second filter means which is disposed toward the outlet port in the flow direction.

15. A filter apparatus according to claim 12, further comprising a first spacing means which spaces the first filter means from the one side of the housing.

16. A filter apparatus according to claim 12, further comprising a second spacing means that spaces part of the first filter means from the bag filter means.

17. A filter apparatus according to claim 16, wherein the second spacing means comprises a ring that connects the first opening in the first filter means with the second opening in the second filter means.

18. A filter apparatus comprising:
    a housing;
    an inlet port on one side of the housing;
    an outlet port on an opposed side of the housing;

first filter means spanning at least partially across the housing with a first opening through the first filter means;

second filter means with a second opening into the second filter means; and spacing means for spacing the second filter means apart from the first filter means and for connecting the first opening to the second opening, wherein both filter means are mounted inside the housing so that some fluid entering the inlet passes through both openings and through the second filter means and then to the outlet, and other fluids entering the inlet passes through the first filter means and then to the outlet.

19. A filter apparatus according to claim 18, wherein the second filter means is relatively coarser than the first filter means.

20. A filter apparatus according to claim 18, wherein the first filter means is disposed towards the inlet port, relative to the second filter means which is disposed toward the outlet port in the flow direction.

21. A filter apparatus according to claim 18, further comprising a second spacing means for spacing the first filter means from the one side of the housing.

22. A filter apparatus according to claim 18, further comprising a third spacing means for spacing part of the first filter means from the second filter means.

23. A filter apparatus according to claim 22, wherein the third spacing means comprises a ring that connects the first opening with the second opening.

* * * * *